US006792288B1

(12) United States Patent
Billiot

(10) Patent No.: US 6,792,288 B1
(45) Date of Patent: Sep. 14, 2004

(54) ANALOG INTERFACE FOR AUTONOMOUS DATA EXCHANGE CIRCUIT

(75) Inventor: Gérard Billiot, St Nagaine-les-Eymes (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/743,428

(22) PCT Filed: Jul. 7, 1999

(86) PCT No.: PCT/FR99/01641
§ 371 (c)(1),
(2), (4) Date: Jan. 8, 2001

(87) PCT Pub. No.: WO00/03351
PCT Pub. Date: Jan. 20, 2000

(30) Foreign Application Priority Data

Jul. 8, 1998 (FR) .............................. 98 08750

(51) Int. Cl.[7] .............................. H04B 1/38; H04M 1/00
(52) U.S. Cl. .................... 455/558; 455/41.1; 455/127.1
(58) Field of Search ................................ 455/66.1, 558, 455/41.1–41.3, 78–83, 90.3, 127.1, 572

(56) References Cited

U.S. PATENT DOCUMENTS 5,698,838 A   12/1997   Yamaguchi 6,624,743 B1 * 9/2003 Ikefuji et al. .............. 340/10.4
6,659,352 B1 * 12/2003 Asada et al. ................. 235/492
6,703,921 B1 * 3/2004 Wuidart et al. ............ 340/10.4

FOREIGN PATENT DOCUMENTS

| EP | 0706151 | 4/1996 |
| EP | 0764920 | 3/1997 |
| WO | WO96/38805 | 12/1996 |

OTHER PUBLICATIONS

Allen P. E., et al. "COMS Analog Circuit Design" *Jan. 1996, Holt, Rinehart and Winston Inc., New York*, XP002098191, p. 327 through 334.

* cited by examiner

*Primary Examiner*—Charles Craver
(74) *Attorney, Agent, or Firm*—Thelen Reid & Priest LLP

(57) ABSTRACT

Analogue interface (24) for an, information exchange circuit by amplitude modulation of a carrier wave, comprising an interface input (102, 104) intended to be connected to the terminals of an antenna (22), a demodulator (150) one output of which is connected to a logical unit (26) in the information exchange circuit, and means (106) of supplying a power supply voltage to the information exchange circuit. According to the invention, the interface also comprises means of rectifying and filtering (116, 118) the carrier wave, connected to one input of the demodulator (150) and a device (120, 122, 132) for regulating the said power supply voltage.

Application in particular to the identification and sorting of objects or persons.

16 Claims, 3 Drawing Sheets

ANALOG INTERFACE FOR AUTONOMOUS DATA EXCHANGE CIRCUIT

This application is a national phase of PCT/FR99/01641 which was filed on Jul. 7, 1999 and was not published in English.

TECHNICAL FIELD

This invention relates to an analogue interface for a self-contained information exchange circuit.

Self-contained information exchange circuits can be used on objects, for example such as objects processed on a production line, or portable data storage cards. Information exchanges between the self-contained information exchange circuit and a fixed station take place inductively without any contact.

The information exchange circuit, and the object on which it is used, are usually not provided with an independent electrical power supply. The energy necessary for their operation is supplied inductively from the fixed station.

Consequently, the analogue interface according to the invention performs a data transmission/reception function and a function to supply electrical power to the circuit on which it is used.

The invention is used in applications, particularly for the identification and sorting of objects to be made, processed or stored, and in portable "smart card" type equipment.

Other examples of uses of the invention are in transport, production monitoring and animal identification activities.

STATE OF PRIOR ART

FIG. 1 attached represents the main components of an information exchange circuit used on a portable object and associated with a fixed station, in the form of functional blocks.

The fixed station, marked with general reference 10, is provided with an antenna 12 capable of receiving a signal from an information exchange circuit used on a mobile object and capable of transmitting a signal to this circuit.

The information exchange takes place by modulation of a carrier wave.

The general reference 20 indicates an information exchange circuit used on a mobile object not shown. This circuit is also provided with an antenna 22 for transmission and reception of a carrier wave that may be modulated by the exchange circuit 20 (in transmission mode) or by the fixed station 10 (in reception mode).

An analogue interface 24 for the circuit 20 has an input/output 23 connected to antenna 22 and a first input/output 25 for exchange of data signals with a logical processing unit 26 such as a microprocessor unit. The logical unit is associated with memory means 28 in which data to be exchanged are stored.

A second output 30 from the analogue interface outputs an electrical power supply energy to the logical unit 26 and the memory 28, as shown by an arrow 31. This energy is output from the inductive energy received by the antenna 22.

The document (1) referenced at the end of this description describes an analogue interface for an information exchange circuit adapted to "On/Off" type modulation on reception. The interface comprises two rectification and regulation units designed to extract data, information and the power supply energy necessary for the circuit, from the signal present at the terminals of an antenna.

This type of interface operates satisfactorily within a given amplitude range of the received signal. When the received signal is weak, the information exchange circuit no longer works due to an insufficient electrical power supply.

Conversely, when the field applied to the antenna is very strong, very high currents pass through the rectification and regulation units. Thus, the components of these units need to be very much oversized to prevent these units from being destroyed under the effect of overcurrents. However, this constraint is hardly compatible with miniaturization of the information exchange circuit.

Document (2), also referenced at the end of the description, describes an analogue interface for an information exchange circuit based on phase modulation of a carrier wave.

The described device is equipped with means for adjusting the level of the received signal and can overcome difficulties related to overvoltages or overcurrents in interface components.

Operation of this type of device is satisfactory when the frequency of the signal carrier wave (phase modulated) is low, less than 1 MHz. The solution proposed in document (2) for use with a carrier wave frequency greater than 10 MHz, results in unacceptable electricity consumption particularly for demodulation, and hardly compatible with the self-contained nature of information exchange circuits.

PRESENTATION OF THE INVENTION

The purpose of this invention is to propose an analogue interface for an information exchange circuit that does not have the limitations of the devices mentioned above.

One purpose in particular is to propose this type of interface for an information exchange circuit by amplitude modulation of a carrier wave.

Another purpose is to propose such an interface adapted to operate within a high frequency range with carrier waves at a frequency greater than 10 MHz.

Another purpose is to propose an interface with a very low energy consumption that can be very highly integrated in the form of a chip.

Another purpose is to propose such an interface with a small number of components and adapted for large-scale industrial manufacturing.

Finally, another purpose is to propose an interface capable of operating satisfactorily despite high variations in the intensity of the inductive field received by the antenna in the information exchange circuit.

More precisely, the purpose of the invention to achieve these objectives is an analogue interface for an information exchange circuit by amplitude modulation of a carrier wave, including an interface input designed to be connected to the terminals of an antenna, a demodulator with an output connected to a logical unit in the information exchange circuit, and means of supplying a power supply voltage to the information exchange circuit.

According to the invention, the interface also comprises means of rectifying and filtering the carrier wave connected firstly to an input of the demodulator and secondly to a device for regulating the said power supply voltage.

Due to the characteristics described above, and particularly the regulation device, the circuit may be protected against overcurrents and overvoltages. The only current that passes through the interface and logical unit components is a minimum current necessary for their operation, and the components can be made very small. Furthermore, rectifying and filtering means are used in common for processing the signal intended for the demodulator and for regulation of the power supply. Savings in space, cost, operating energy and manufacturing price can thus be obtained.

Furthermore, the interface may operate at carrier wave frequencies greater than 10 MHz. Rectification and filter means placed immediately behind the antenna can be used to supply a low frequency signal to the demodulator, and therefore to the modular circuit. Signal processing is then possible without causing excessive energy consumption.

The regulation device may comprise means of modifying the antenna impedance as a function of a rectified voltage output by rectification and filter means.

These impedance modification means help to make the antenna more or less receptive to the received inductive field and consequently eliminate current or voltage variations in the circuit that could be caused by variations in the intensity of the inductive field.

According to one particular embodiment of the means of modifying the antenna impedance, these means may comprise a controllable load connected to the input to the interface in parallel to the antenna terminals.

The controllable load may be made for example starting from a field effect transistor in which the channel terminals (source and drain) are connected to the antenna terminals through resistances.

The power supply voltage regulation device may also comprise:

a reference voltage source, and means of comparing the rectified voltage output by the rectification and filter means, with the reference voltage. The comparison means are connected to a control input applied to means of modifying the antenna impedance to control the impedance modification means as a function of a difference in voltage between the rectified voltage and the reference voltage.

The rectification and filter means may be connected to the demodulator, also through comparison means, and/or can be connected through a direct electrical link.

For example, the comparison means may comprise an amplifier with a positive input connected to the rectifier, a negative input connected to the reference voltage source and a control output connected to the impedance modification means.

The comparison means amplifier may be an operational amplifier in which the non-inverting and inverting inputs form the positive and negative inputs respectively.

The comparison means may also be made from a field effect transistor, particularly a PMOS type transistor, with a grid forming the negative input, a first channel terminal forming the positive input and a second channel terminal forming the output.

Other characteristics and advantages of this invention will become clear after reading the following description with reference to the figures in the attached drawings. This description is given for illustrative purposes only, and is in no way limitative.

DETAILED DESCRIPTION OF EMBODIMENTS OF THE INVENTION

Figure 1:
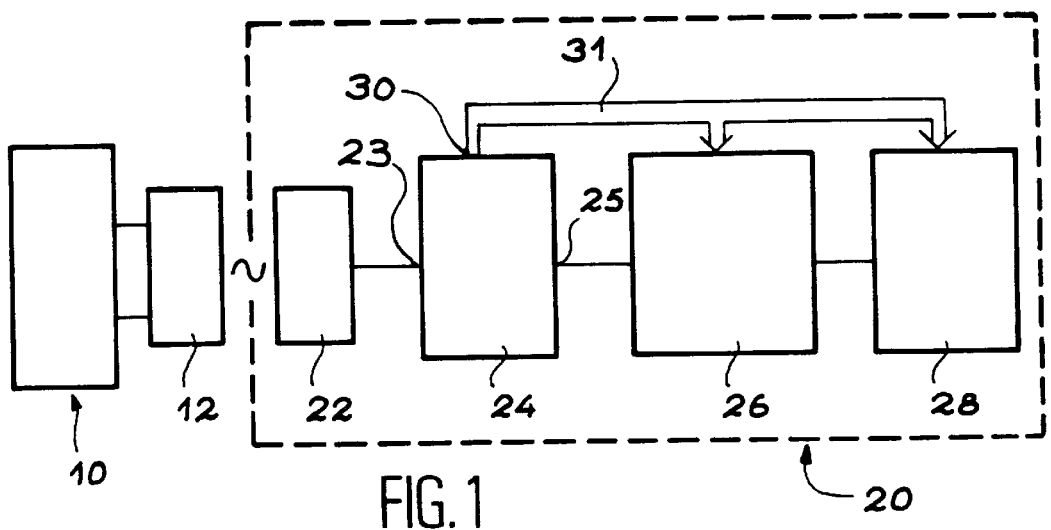
FIG. 1 described above is an illustration in the form of a functional block diagram, showing the main devices in an information exchange circuit in which the interface according to the invention can be applied.

By analogy with FIG. 1 described above, the general reference 24 in FIG. 2 denotes the interface of an information exchange circuit. This circuit also comprises a transmission reception antenna, a logical processing unit and a memory unit.

Still by analogy with FIG. 1, the antenna, the logical unit and the memory are marked with references 22, 26 and 28 respectively. The logical unit and the memory are not shown in FIG. 2, but are simply shown by their reference between parentheses.

The input 23 to the interface 24 is composed of two terminals 102 and 104 connected to the terminals of antenna 22.

A first rectifier 106, for example shown diagrammatically in the form of a bridge of four diodes 106a, 106b, 106c, 106d, is connected to the antenna input terminals 102, 104. Any other rectification device could be used.

A power supply voltage output to the different devices in the information exchange circuit, and particularly to the logical unit 26 and the memory 28, is taken from the output terminals 108, 110 of the first rectifier 106.

A first output terminal 108 is formed by the cathodes of two diodes 106c, 106d of the rectifier 106, the anodes of the rectifier being connected to the input terminals 102, 104. The second output terminal 110 is formed by the anodes of the two diodes 106a, 106b, the cathodes of which are connected to the input terminals. In the example described, the second output terminal 110 forms a ground terminal, the negative reference in interface 24.

A second rectifier 116 comprises two diodes 116a and 116b, in which the anodes are connected to the input terminals 102 and 104 of the interface, respectively. The output from the second rectifier 116 is composed of the cathodes of diodes 116a and 116b that are connected in common to a first armature of a filter capacitor 118.

According to one variant, the diodes 106a, 106b, 106c, 116a and 116b may also be replaced by field effect transistors used as junctions, in which the channel is connected to one of the terminals of the channel (drain or source). Furthermore, external connecting resistances may be used on the grid, channel and source terminals of these transistors.

The second armature of the filter capacitor is connected to the ground terminal 110.

A rectified and filtered voltage is available at the terminals of the filter capacitor 118, the value of which is proportional to the voltage output by the antenna, in other words is proportional to the intensity of the inductive field seen by the antenna. This voltage is simply denoted the "rectified voltage" in the following.

The rectified voltage is used for the power supply of a reference voltage source 120. The reference voltage source is used to output a constant output voltage that is predetermined and independent of the power supply voltage within a wide operating range.

The rectified voltage is also used to supply power to an amplifier 122, for example an operational amplifier.

Finally, the rectified voltage is applied to a first input 124 (non inverting) of the amplifier 122, through a resistance bridge 125a, 125b. The second (inverting) input 126 of the amplifier 122 receives the reference voltage output by the reference voltage source 120. The amplifier 122 essentially forms a means of comparing the rectified and filtered voltage with the reference voltage.

A signal output by the output 128 from the amplifier 122 is approximately proportional to the difference between the rectified voltage and the reference voltage. This signal is denoted the "control output" in the following. It is applied to a control terminal 130 of a controllable load 132.

The controllable load 132 is connected in parallel on the input terminals 102, 104, in other words in parallel on the antenna terminals. It is used to modify the antenna impedance to adapt it to the intensity of the inductive field received from a fixed station communicating with the information exchange circuit.

When the inductive field seen by the antenna tends to increase, the voltage available at the terminals 102, 104 of the antenna 22 also increases. Consequently, the output voltage available at the output terminals 108, 110, and the rectified voltage available at the terminals of capacitor 118, also tend to increase. The amplifier then outputs a control voltage that is applied to the controllable load 132 and tends to reduce its impedance and consequently the impedance of the assembly formed by the antenna 22 and the controllable load. This impedance is simply called the "antenna impedance".

Therefore, the antenna is less "sensitive" and the output voltage is regulated.

Conversely, a reduction in the inductive field seen by the antenna will cause an adjustment to the controllable load that will increase the impedance and the sensitivity of antenna 22, through the control output.

According to this principle, the low value amplitude modulation output by the fixed station is present on the control output.

Due to regulation of the antenna impedance, and therefore the current and voltages output by the first and second rectifiers 106, 116, the different components of the interface and the rest of the information exchange circuit are protected from overvoltages and overcurrents that could occur when there are large variations in the received inductive field. Furthermore, since regulation is applied directly to the antenna, the capacitance and the size of components may thus be reduced and integration of components is made easier.

The control output that contains the information signal initially modulated on the carrier wave is also applied to a first input of the demodulator 150, the output of which is connected to the logical unit 26. The demodulator outputs a signal, preferably a digital signal, to the logical unit, corresponding to the signal information initially coded on the carrier wave. The operation of a demodulator is known in itself and is not described in detail here.

It is possible to connect the rectified and filtered voltage available at the terminals of the capacitor 118 directly to a second input of the demodulator 150, in order to extend the operating range of the demodulator beyond an operating range of the components in order to set up the control output. This possibility is shown by a dashed line 127 in the figure.

Figure 2:
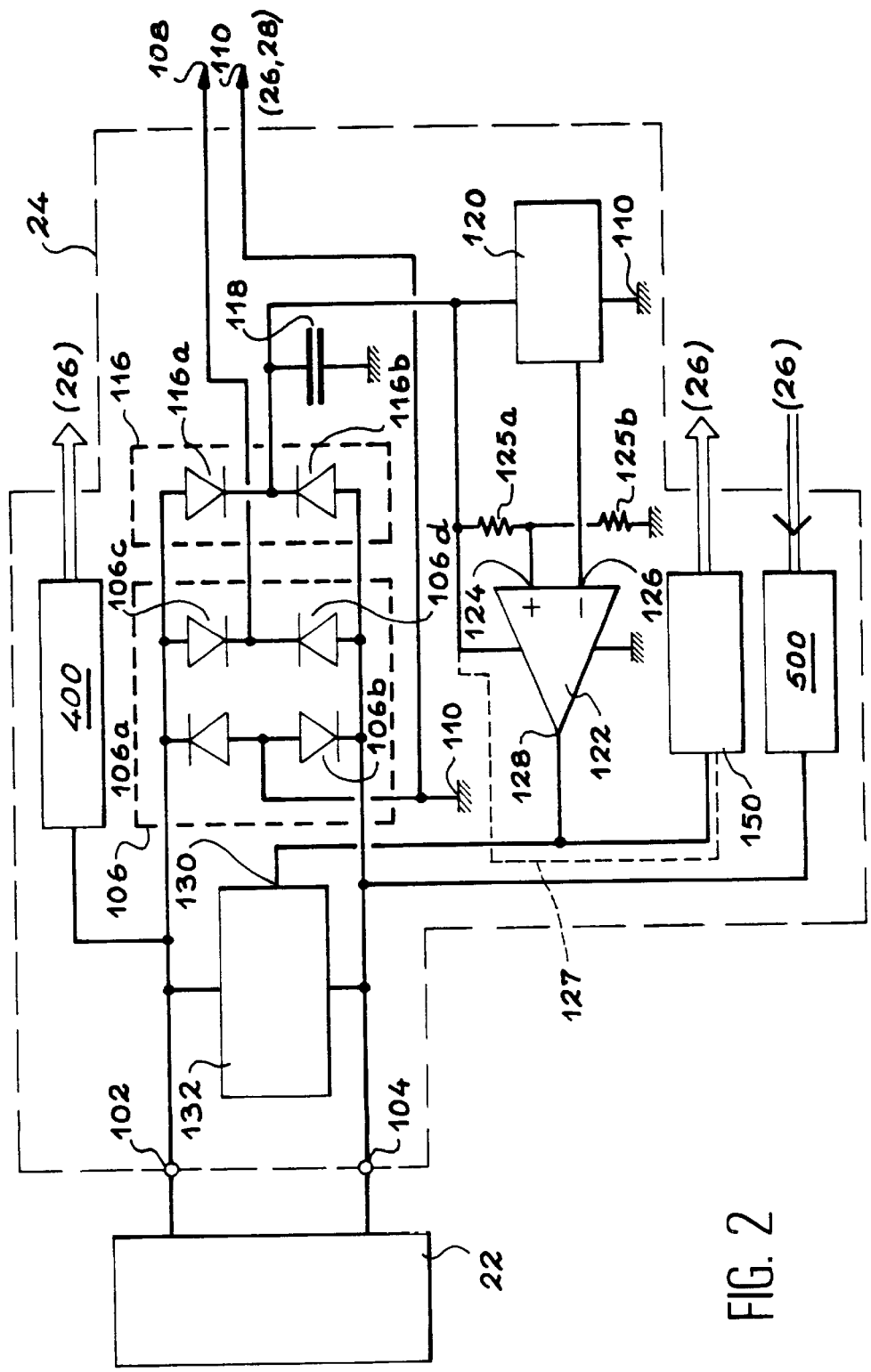
FIG. 2 is a simplified diagrammatic view showing an embodiment of the interface according to the invention.

References 400 and 500 in FIG. 2 show a clock signal generator and a modulator, respectively, that could be used on the interface. These devices are described in detail in the rest of the description.

Figure 3:
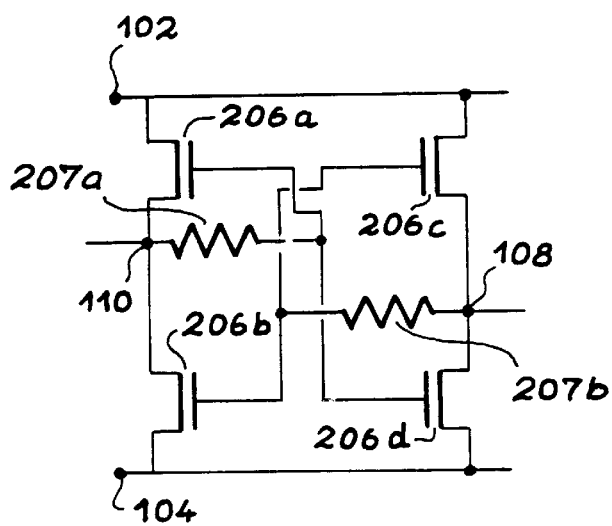
FIG. 3 is a diagrammatic view showing a particular embodiment of rectification means to supply a power supply voltage for the interface according to the invention.

The rectification device 106, 116 in FIG. 2, made around junction diodes, can also be made around field effect transistors, as a variant. This embodiment is shown in FIG. 3.

First and second field effect transistors 206a, 206b, have serial channels between the input terminals 102, 104 of the interface. Similarly, third and fourth field effect transistors are placed in series between the input terminals. The grid of the first transistor 206a is connected to the grid of the fourth transistor 206d and connected through resistor 207a to a common node 110 between the first and second transistors. The grid of the second transistor 206b is connected to the grid of the third transistor 206c and through a resistor 207b to a node 108 between the third and fourth transistors. Nodes 108 and 110 form the output terminals from the first rectifier. A DC power supply voltage is available between these terminals for the information exchange circuit.

Figure 4:
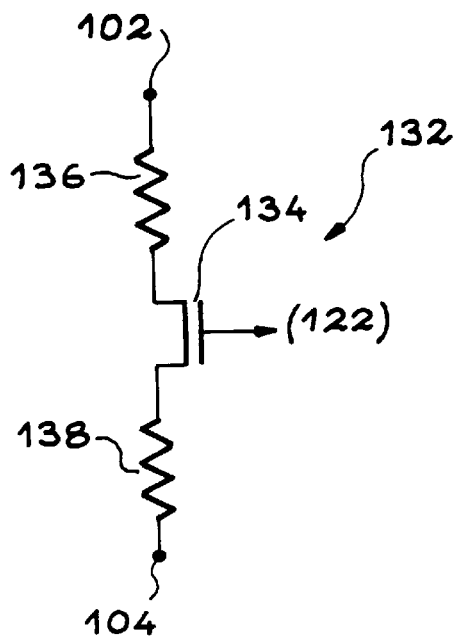
FIG. 4 is a diagrammatic view of a particular embodiment of controllable means of modifying the antenna impedance that can be used in the interface according to the invention.

FIG. 4 shows one possible embodiment of the controllable load connected to the input terminals 102, 104, in other words in parallel to the antenna terminals.

The controllable load comprises an NMOS type field effect transistor 134, the grid of which forms a control terminal connected to the amplifier 122 described with reference to FIG. 2. The transistor channel 134 is connected to the input terminals 102 and 104 respectively through resistances 136 and 138, the values of which are preferably equal to and adapted to the required impedance of the antenna. These resistances provide additional protection to the transistor 134; they reduce the drain and source voltages when a high current passes through the transistor.

In a simplified version, the resistances may be omitted and simply replaced by a conducting line.

Figure 5:
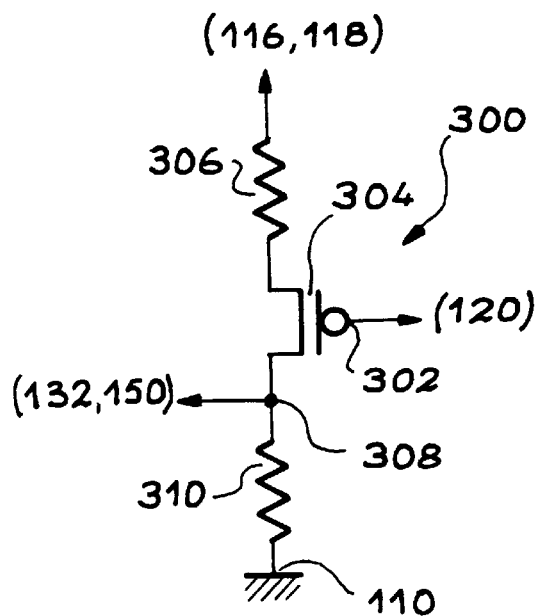
FIG. 5 is a diagrammatic view of a particular and advantageous embodiment of a comparator amplifier that can be used in the interface according to the invention.

FIG. 5 shows one possible way of making means of comparing the rectified and filtered voltage with the reference voltage, forming a variant of the device shown in FIG. 2 which does not make use of an operational amplifier.

The comparison device shown in FIG. 5 comprises a PMOS type field effect transistor 300, the grid 302 of which is connected to the output of the reference voltage source 120, not shown.

The source 304 of transistor 300 receives the rectified voltage output from the second rectifier 116 and the capacitor 118, not shown, through a source resistor 306.

The drain 308 of transistor 300 is connected to the controllable load 132, not shown, and the demodulator 150, not shown. The drain is also connected to the ground terminal 110 through a resistor 310. This device has a limited gain and operates in an open loop, which can give attractive frequency performances for low consumption.

Figure 6:
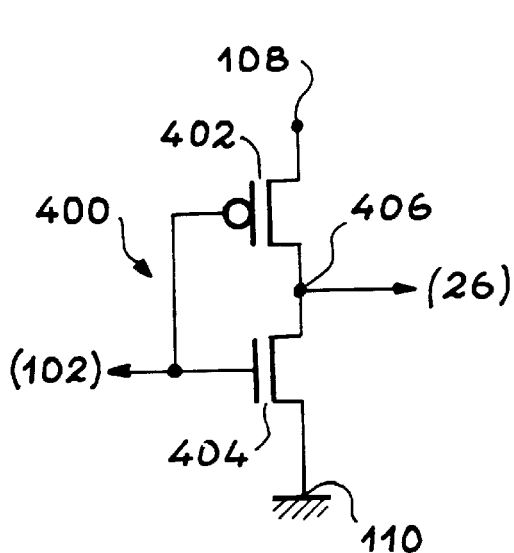
FIG. 6 is a diagrammatic view of a particular embodiment of a clock signal generator that can be used in the interface according to the invention.

FIG. 6 illustrates the embodiment of a clock signal generator 400 that can be used on the information exchange circuit. The clock generator comprises essentially a logical inverter made from two field effect transistors 402, 404, of the PMOS and NMOS types respectively, in series between the power supply terminals 108, 110 (output terminals from the first rectifier not shown).

The grids of transistors 402 and 404 are connected in common to one of the input terminals 102, in other words one of the antenna terminals. The output from the clock generator is made through a node 406 between transistors 402, 404. This node is connected to the logical unit 26, not shown, in the information exchange circuit.

Figure 7:
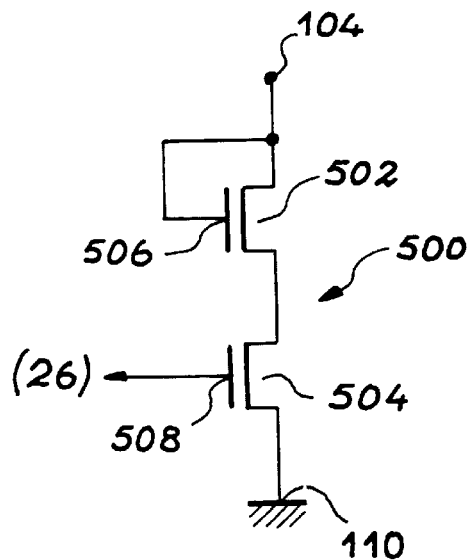
FIG. 7 is a diagrammatic view of a particular embodiment of a modulator that can be used in the interface according to the invention.

FIG. 7 shows a particular embodiment of a modulator 500 that can be used on the interface in order to modulate the carrier wave emitted by the antenna to the fixed station, as a function of signals emitted by the logical processing unit.

The modulator comprises first and second field effect transistors 502, 504 of the NMOS type connected in series and in this order between one of the input terminals 104 of the interface, in other words one of the antenna terminals, and the ground terminal 110. The grid 506 of the first transistor 502 is also connected to the input terminal 104 of the interface. The grid 508 of the second transistor 504 is connected to the logical processing unit 26, not shown, that applies modulation signals to be emitted.

It can be seen that the modulator is of the asymmetric type in the sense that it is only connected to one of the antenna terminals. This specific feature means that the load can be modulated while minimizing the impact of the modulation on the power supply voltage regulation device.

However, it is still possible to consider an embodiment of the interface with a symmetric modulator connected to the two antenna terminals.

Preferably, the clock signal generator 400 and the modulator 500 are connected to different pins on the antenna in order to reduce the influences of the clock signal generator 400 on the modulator 500. However, it is possible to use the same connection pin without having any unwanted effects on operation.

An interface like that described above can be made with a very small number of components and is suitable for very large scale integration. A large saving of space is also obtained as described above, by placing a number of devices such as the second rectifier, the filter capacitor 118 and the amplifier 122 in common, for the voltage regulator device and for the demodulator input.

REFERENCED DOCUMENTS (1)
WO 96/38805
(2)
EP-A-0 706 151

What is claimed is:

1. An analogue interface (24) for an information exchange circuit by amplitude modulation of a carrier wave comprising:
   an interface input (102, 104) intended to be connected to the terminals of an antenna (22),
   a first rectifier (106) supplying a power supply voltage to the information exchange circuit, said first rectifier coupled to said interface input;
   a second rectifier (116) coupled to said first interface input;
   a filter (118) coupled to an output of said second rectifier; and
   a demodulator (150) one output of which is connected to a logical unit (26) in the information exchange circuit, said second rectifier and filter coupled to one input of the demodulator (150) and a device (120, 122, 132) for regulating said power supply voltage.

2. The interface according to claim 1, wherein said regulation device comprises means (132) for modifying the impedance of the antenna (22) as a function of a rectified voltage output by said second rectifier (116) and said filter (118).

3. The interface according to claim 2, wherein said means (132) for modifying the impedance of the antenna comprise a controllable load connected to the interface input (102, 104) in parallel to the terminals of the antenna (22).

4. The interface according to claim 3, wherein said controllable load comprises a field effect transistor (134) in which the channel terminals (source and drain) are respectively coupled to the antenna terminals through resistances (136, 138).

5. The interface according to claim 4, wherein the values of the resistances (136, 138) are approximately identical.

6. The interface according to claim 2, wherein said regulation device comprises:
   a reference voltage source (120), and
   means for comparing the rectified voltage output by said second rectifier (116) and said filter (118), with the reference voltage, said comparison means being connected to a control input (130) applied to means (132) for modifying the antenna impedance to control the impedance modification means as a function of a difference in voltage between the rectified voltage and the reference voltage.

7. The interface according to claim 6, wherein said comparison means comprise an amplifier (122) with a positive input (124) coupled to said second rectifier (116), a negative input (126) connected to the reference voltage (120) source and a control output (128) connected to the impedance modification means (132).

8. The interface according to claim 7, wherein said second rectifier (116) and said filter (118) coupled to the demodulator through said comparison means, the amplifier output (128) being connected to the demodulator input (150).

9. The interface according to claim 7, wherein said amplifier (122) is an operational amplifier in which the non-inverting and inverting inputs form the positive and negative inputs respectively.

10. The interface according to claim 6, wherein said comparison means comprise a field effect transistor (300) with a grid (302) forming the negative input, a first channel terminal (304) forming the positive input and a second channel terminal (308) forming the output.

11. The interface according to claim 1, wherein said demodulator has an input directly connected to said second rectifier and said filter.

12. The interface according to claim 1, further comprising a clock signal generator (400) with an input connected to one of the terminals (102) of the antenna (22) and one output connected to the logical unit (26).

13. The interface according to claim 1, further comprising a second modulator (500) with one input connected to the logical unit (26) and one output connected to one of the antenna terminals (104).

14. The interface according to claim 1, wherein the frequency of the carrier wave is greater than 10 Megahertz.

15. Information exchange circuit comprising an interface according to claim 1.

16. Information exchange circuit comprising an interface according to claim 14.

* * * * *